United States Patent
Fletcher, Jr. et al.

[11] 3,895,762
[45] July 22, 1975

[54] WIRE COILING SYSTEM

[75] Inventors: Ralph P. Fletcher, Jr., Snohomish; Ted C. Pratt, Everett, both of Wash.

[73] Assignee: Wiretech Corporation, Edmonds, Wash.

[22] Filed: May 29, 1973

[21] Appl. No.: 365,037

[52] U.S. Cl.............. 242/54 R; 242/25 R; 242/83; 29/605
[51] Int. Cl....................... B65h 75/00; B65h 54/00
[58] Field of Search ......... 242/79, 82, 83, 84, 25 R, 242/25 A, 118, 118.1, 118.4, 118.41, 118.6, 118.61, 129, 125.1, 116, 77.2, 77.3, 18, 18.1; 206/52 W; 140/92.2; 29/605, 203 MW

[56] References Cited
UNITED STATES PATENTS

| | | | |
|---|---|---|---|
| 398,772 | 2/1889 | Day | 242/78 |
| 1,316,972 | 9/1919 | Prentiss | 242/116 |
| 1,531,147 | 3/1925 | Smith | 242/116 |
| 2,314,749 | 3/1943 | Willner | 242/118.61 |
| 2,575,131 | 11/1951 | Salkin | 242/118.6 |
| 3,130,929 | 4/1964 | Shiels et al. | 242/25 R |
| 3,584,819 | 6/1971 | Brough | 242/118.61 |

*Primary Examiner*—John W. Huckert
*Assistant Examiner*—Jon W. Henry
*Attorney, Agent, or Firm*—Seed, Berry, Vernon & Baynham

[57] ABSTRACT

A method and apparatus for taking bulk electrical wire, as supplied by the manufacturer during coding and cutting it to the approximate length, power recoiling it in a fashion whereby the leading end may be easily determined and a plurality of the re-coiled wires may be simultaneously unwound from a spool without tangling.

3 Claims, 5 Drawing Figures

WIRE COILING SYSTEM

BACKGROUND OF THE INVENTION

Aircraft and aerospace industries utilize wire harnesses or a group of wires which are handled as a subassembly during the assembly of the aircraft. Individual wires are pre-cut to a prescribed length for later use in a harness assembly so they will begin and terminate at the appropriate place in the vehicle.

Present methods of preparing pre-cut wire in industries such as aircraft employ a free rotating pan wherein the wire is formed into a coil inside the pan as it is fed from a wire source, i.e., marking machine, measuring device or the like. This method, although utilized to a large extent by the aerospace or aircraft industry, has several drawbacks which have a great deal of impact on later functions in the harness assembly system. One of the drawbacks is that the loosely wound coils are irregular in size, creating difficulty in handling during harness forming. Another difficulty is that the free end of the wire, i.e., the first end into the pan, tends to weave itself in and out of the coil as it winds up in the pan. This intertwining causes tangles which must be straightened out when the wire is eventually formed into a harness. The future utilization of the wire requires extra time to overcome the drawbacks thus slowing the process and making it more expensive. The presently utilized method generates the two above-noted problems, as a practical matter, each wire must be handled individually during the formation of the harness and individual ties be installed on each wire as it is coiled. These ties must then be removed one at a time prior to forming a harness.

Several attempts have been made to resolve these problems described hereinabove, one of which involves winding the individual wires on separate spools at a coding machine. While this is mechanically and physically possible, it has proven to be impracticable from a cost standpoint. It further suffers a disadvantage in that it becomes cumbersome in the production areas wherein it is necessary to handle a large volume of spools requiring a great deal of space adjacent the forming table.

To obviate some of the problems noted above, it is desired to have a system wherein the individual wires will be power coiled in segments of a predetermined length and then may be easily and quickly formed into a harness. Prior patent art which has come to the attention of the inventor and is deemed to be pertinent, although non-anticipatory of the present invention, includes the U.S. Pat. No. 351,584, granted to Dixon on Oct. 26, 1886, and No. 3,059,386, granted to Vorrath, et al., on Oct. 23, 1962, which disclose a method of wrapping or strapping a coil package. Although these two references do teach the concept of a uniformwrap, they do not anticipate the present invention in that the wrap shown is about the surface of the torus.

U.S. Pat. No. 242,188, granted to Cuff on May 31, 1881, discloses a spool or reel for coiling wire or the like but fails to teach the spool wherein the wire may be automatically wound and quickly and easily removed therefrom by an operator without substantial interruption of the process.

The patent to Brogan, U.S. Pat. No. 1,472,044, granted Oct. 30, 1923, deals with an apparatus for producing nail strings. The apparatus includes a tensioning device which assures that the coiled string of nailshas a uniform tension throughout the coil but is not concerned with a total system which involves rewrapping wires in predetermined lengths and then providing for a quick and easy removal thereof as a coiled unit. The present invention, because of its unique characteristics as described hereinafter, requires a guiding device for beginning the wrap which is adapted to absorb sudden shock generated by the coding device, a function which is not accomplished by the device to Brogan.

U.S. Pat. No. 1,538,136, granted May 19, 1925, to Prentiss, et al., deals with a method of winding a coil of wire upon a spool and involves manually inserting the beginning end of the wire through a slot in the spool. The spool is specifically designed to allow the operator to then wrap securement around the coil prior to removal from the spool which has a removable end portion.

The patent to Lacks, U.S. Pat. No. 2,170,334, granted Aug. 22, 1939, discloses a bobbin for wire weaving looms and includes a specific bore 15 for receiving the beginning wind of the wire prior to filling the bobbin. It is obvious that to begin winding, it is necessary for the operator to carefully place the end of the wire in this particular bore.

U.S. Pat. No. 2,988,292, granted to Bliss on Jun. 13, 1961, emphasizes the importance of uniform winding in that he discloses a method of assuring a level wind on the spool to prevent tangling during the unwinding, a problem which is similarly faced in the present operation.

The problem of supplying several wires from a single spool is attacked by U.S. Pat. No. 3,450,359, granted to Draving, et al., Jun. 17, 1969, and, as can be seen, Draving utilizes a separate device to assure that the wires are maintained in a spaced location and fed individually without tangling.

Another type of spool for winding wire is disclosed in U.S. Pat. No. 3,472,461, granted to Fredriksson on Oct. 14, 1969. This device requires that the end of the wire be pressed into the edge of the spool prior to winding.

A general discussion of the problem of winding wire or the like is found in British Pat. No. 993,608, inventor, Alois Sackl, and it is to be noted that his configuration includes a slot in the spool wherein the end of the wire netting or the like is inserted and then captured by outwardly protruding fingers or the like which span the slot.

With the above-noted problems and prior art in mind, it is an object of the present invention to provide a system for rewinding individual wires which have been cut to length and then forming them into a harness whereby a great deal of the manual labor is eliminated.

It is a further object of the present invention to provide a method of forming a wire harness which is, to all intents and purposes, automatic, taking the wire from manufacturer-provided spools, coding it, cutting it to length, power rewinding it, placing it on a spool with other wires which are going to be utilized in the same harness and then forming it into a harness without tangling the wires in the process.

It is still a further object of the present invention to provide a unique power recoiling device which automatically recoils manufacturer-provided wire in shorter lengths which may be quickly and easily removed and unwound without tangling.

Still another object of the present invention is to provide a feeder system whereby the wire will be directed to an automatic pick-up device and then be automatically moved to a secondary position whereat it will absorb any shock generated during the coding of the wire.

BRIEF DESCRIPTION OF THE DRAWINGS

FIG. 1 is a schematic representation showing the steps utilized in taking the individual wires from spools provided by the manufacturer and forming them into a harness for use in aerospace industry or the like.

DETAILED DESCRIPTION OF THE DRAWINGS

Figure 1:
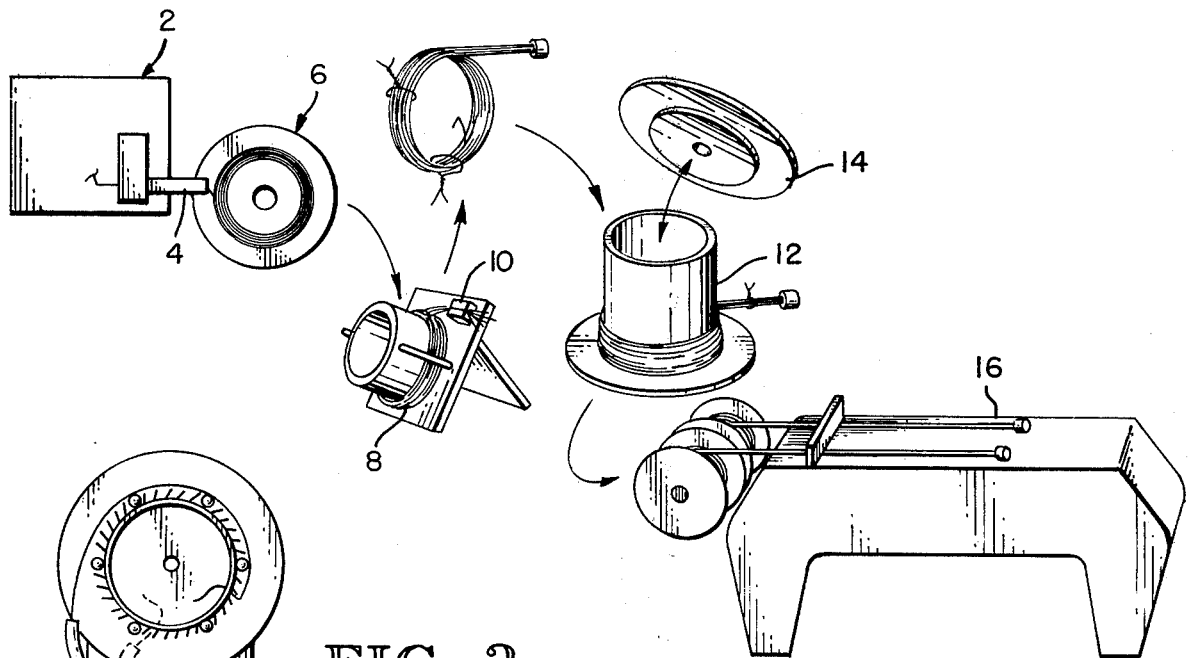
Figure 3:
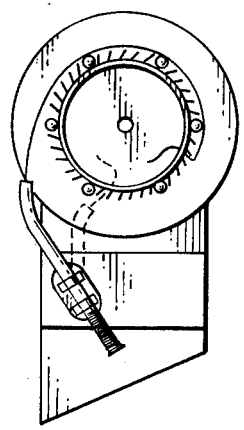
FIG. 3 is a top view of a section of the winding cage showing a wire end trapped in position.

As shown schematically in FIG. 1, the wire which is to be processed is transmitted from a spool of wire (not shown) as supplied by the manufacturer and passes through a coding machine 2 whereat the wire is stamped with the particular identification code required by the specification. The coding machine is a purchased item and not considered a part of the present invention. From the coding machine the wire is passed through a feeder tube 4, to be described hereinafter, and automatically coiled upon an automatic coiler 6 having an automatic pickup apparatus and a power driven pan as will be described hereinafter. Following the power coiling of the wire, if the wire is to be used in the vertical formboard method of harness assembly, each wire coil is secured with a tie and processed in the manner customary to that system. If the wire is to be used in conjunction with a mechanized harnessing method it is placed upon a holding jig 8 where it is retained until all of the wires of the group are thus prepared. At this point in time, the loose ends of the coils are secured in a clamp fixture 10, the wires of the group are tied together and connectors may be installed upon the ends when all of the wires of a group have been power coiled. The prepared coils are then placed upon a spool 12 which has a removable end 14. The spools which then carry a multiplicity of groups of wires are used to supply a wire harness forming table 16 in a manner such as described in U.S. Pat. Application Ser. No. 231,925, filed Mar. 6, 1973, which is a continuation of Patent Application Ser. No. 55,502 filed July 16, 1970, in the name of one of the inventors of the present invention.

Figure 2:
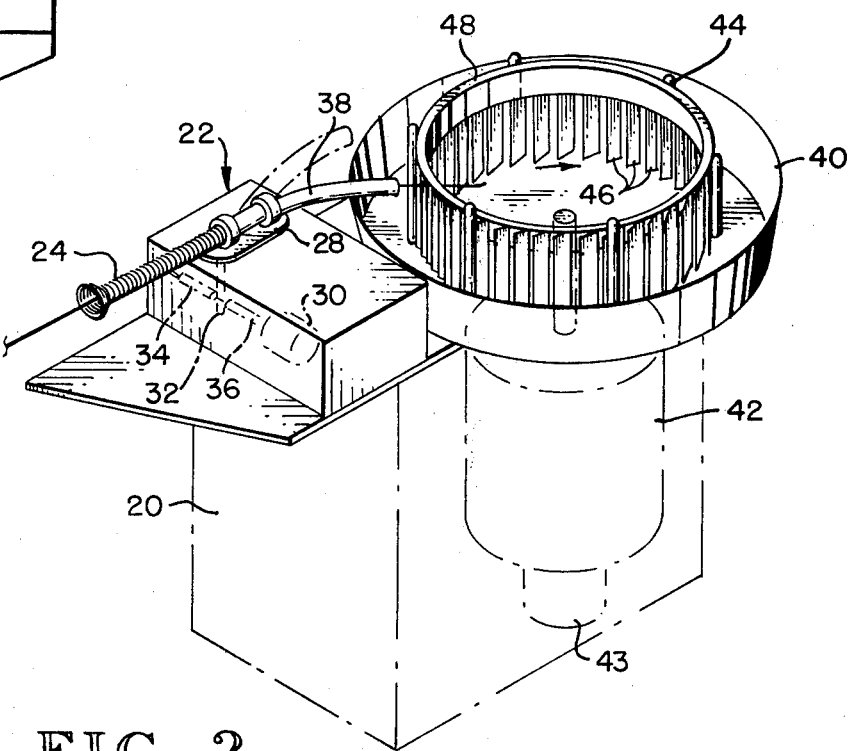
FIG. 2 is an isometric representation of the wire guide means, as well as the power respooling apparatus.

Referring now to FIG. 2, the coiling mechanism which automatically recoils wire which now has been coded can most readily be seen. The entire mechanism is mounted upon a framed cabinet structure 20 which contains a motor to drive the power coiler and other control apparatus. The wire is fed from the coding machine, as noted with respect to FIG. 1, through a feed tube 4 which is pivotally mounted such that it may be moved from a first position for initiating the automatic pickup of the wire, as will be explained hereinafter, to a second position as shown in phantom, for the coiling of the wire itself. The wire, being fed to the coiler, first passes through the center of a coil spring forming tube section 24. The coil spring 24 allows the tube to flex and thus serves as a flexible coupling permitting the tube to move from the first to the second position. The spring section 24 is secured to a solid section 38 mounted upon a platform 28 which is in turn secured in a bearing. Platform 28 further includes a downwardly projecting portion 32 having a pair of tension springs 34, 36 secured thereto, 34 acting as a return spring and 36 acting as a shock spring coupling to air cylinder 30.

The end of the feed tube 22 closest to the recoiling mechanism includes a solid curved tube 38. This end of the tube serves to direct the wire to the coiling mechanism as will be explained hereinafter.

The coiling mechanism itself comprises a powered pan 40 which is driven by a variable torque motor 42. A one way bearing 43 is mounted to the staff of motor 42 to prevent backlash of the pan, a movement which tends to cause a slack in the coil allowing it to flex over the cage. Mounted within the pan and adapted for movement therewith is a squirrel cage type mechanism having a plurality of upwardly extending posts 44 and a plurality of vertically disposed vane members 46 angled at a position such that the leading end of the wire to be coiled may be easily inserted. The top portion of the vanes 46 is capped by a protective nylon ring 48 which serves to retain the coil in a position low upon the coiler and further prevents it from climbing off the spool during the power coiling. The ring or band 48 also provides a smooth surface allowing easy removal of the coil, including the first end which has been captured between the vanes, by preventing jamming of the wire into the upper corner. The ring 48 also prevents the operator from inadvertent injury since it serves as a protective shield, covering the sharp edges of the vanes themselves.

In operation, the lead end of the wire is fed from the coding machine through the tubes 24 and 38 which are in its first position whereat the end of the tube and thus the wire is directed between a pair of vanes upon the cage. The operator stops the torque motor by holding the pan and the lead end of the wire is automatically inserted between the vanes 46. The operator allows the pan to begin rotation which places a slight bend in the lead end of the wire as it is grabbed by the vanes and retains the same during coiling. After the wire has been coiled one-half to threefourths of a controlled turn the directing tube moves to its second or normal position, as shown in phantom, whereat the wire is more directly fed along a tangent and thus allows room for the building of a coil upon the drum and provides space for the tube 38 to be moved by action of the wire. Movement of the tube, caused by the wire stopped by the coding machine during its print cycle is absorbed by spring 36.

The movement of the tube from the first to the second position is controlled by a circuit described hereinafter, but suffice it to say at this point that the cylinder 30 is automatically timed in response to the operation by a signal from the coder to move the tube from the first position to the second position and then return the tube to the first position to begin another cycle following the coding and cut of the given wire. The tube is subjected to intermittent jerks during operation since the coding machine stamps a series of numerals upon the wire and therefore has to briefly halt the wire for the stamping, causing intermittent forward motion. The feed tube mechanism, because of the springs 34, 36 and the flexible end 24, flexes to accommodate this intermittent feeding without unduly stressing the wire and/or related equipment.

A torque motor 42 is utilized to drive the coiling pan so that a constant torque may be applied assuring a uniform coil and yet the same coiler may be used for a wide variety of gauges of wire without subjecting the smaller gauges to undue stress. It is to be noted again at this point, the combination of the variable torque motor and the one way bearing permits the operator to adjust the mechanism such that the coil is uniform but not so tight as to impede removal from the coiler. The one way bearing prevents a reverse movement of the mechanism thus preventing both loose loops and loops which would climb over the coiler.

Figure 4:
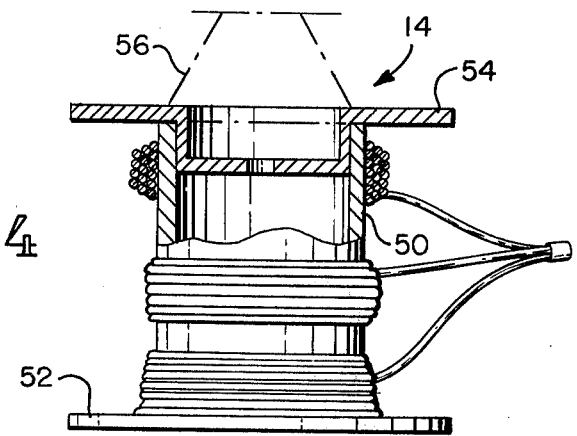
FIG. 4 is a side view, partially in section, disclosing the spool for a plurality of individually pre-wound wires.

As seen in FIG. 4, the coils which are to be used in a single harness are placed upon a single spool. If more than one spool is necessary, such will be used; however the spools are provided in a variety of lengths to accommodate the number of individual coils needed.

The spool core 50 is slightly smaller in diameter than the outer diameter of the upwardly extending posts of the winding mechanism. The spool has one fixed flange 52 and one removable flange 54. To assist in placing a plurality of coils upon the spool a cone shaped aligning member 56 such as shown in phantom is utiliized.

The unique feature of the coils, as wound by the present method, lies in the fact that all of the coils for a specific harness or group may be simultaneously unwoundn from the spool and will not interfere or tangle with each other as long as the trailing end, i.e., that endwhich was last wound, is the end which is first taken off and utilized on the forming board. It is easy to recognize which end is to be utilized since the lead end has been bent by operation of the squirrel cage winding mechanism.

Figure 5:
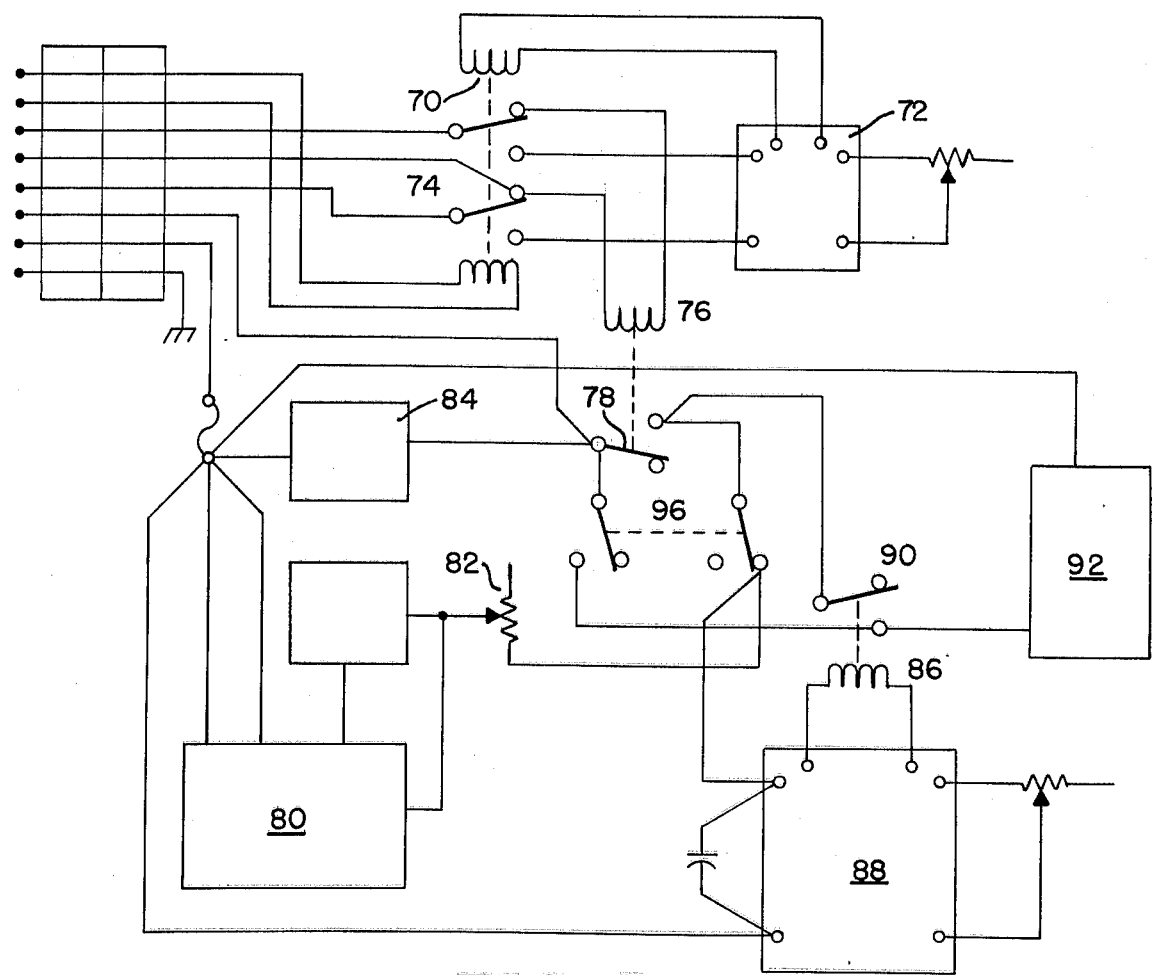
FIG. 5 is a schematic representation of the electrical system necessary for the coding and control of the machine.

The control circuit for the system is shown in FIG. 5. As seen in this Figure the control for the coding device is the upper portion of the diagram and includes a relay or inductor coil 70 which is controlled by the time delay mechanism 72 such that the coder will not begin operation again until a predetermined time following a cut of the previously coded wire. The movement of the switch 74 controls the current to relay 76 which completes the circuit by closing switch 78 and activating the motor 80. Included in the circuit to the motor 80 is a rheostat 82 to control the tension placed upon the wire by controlling the torque generated by motor 8 keeping a sufficiently tight coil but not overly stressing the small gauges making them difficult to remove from the coiler. Included as an integral part of the circuit and actuated at the proper time is a blower 84 for cooling the motor. Following the initial operation of the motor a relay 86 is actuated, following a time delay generated by mechanism 88, and the relay closes switch 90 which operates air cylinder 92 and thus moves the coil directing tube to its second or coiling position. Also included in the mechanism is a short wire switch 96 which is manually operated when the harness calls for a short wire or other irregular insert which although necessary in the harness, will not be coiled. The operator may manually collect the short wire or have it fed into the pan following the necessary coding.

In summary, it can be seen that the present mechanism permits rapid and inexpensive power recoiling of wire. The recoiling is such that the wire is placed in a more usable form, greatly reducing the total number of man hours necessary to form a multi-wire harness or the like. The unique method of recoiling permits the placement of several individual coils upon one spool and all of the coils may be simultaneously unwound without tangling of an individual coil or the inter tangling of two or more coils.

The embodiments of the invention in which an exclusive property or privilege is claimed are defined as follows:

1. A method of producing an electrical wire harness for installation in aircraft and the like comprising the steps of individually forming a plurality of coils of wire on a powered wire coiling device, wherein the inside diameter of the coils are relatively uniform, maintaining tension on the wire as the respective coils are formed to produce relatively tightly wound coils, removing each coil of wire from the wire coiling device after a coil of desired length is formed, processing the individual coil to join the exposed ends of two or more coils, positioning a plurality of coils of varying length, outside diameter and sizes of wire on a common spool in side-by-side relationship and wherein the respective coils are free to rotate relative to the spool, joining the exposed ends of all of the coils of wire on the spool by means of a single clamping connector means and withdrawing the wires from the separate could simultaneously to permit the layout of the harness with the respective wires in the desired relationship and position.

2. A method of forming an electrical wire harness as in claim 1 wherein the respective coils are separately processed and stored after the coils are formed and prior to positioning the coils on the spool.

3. The method as in claim 1 and further including the step of code stamping the wire prior to power coiling.

* * * * *